United States Patent Office 3,277,442
Patented Oct. 4, 1966

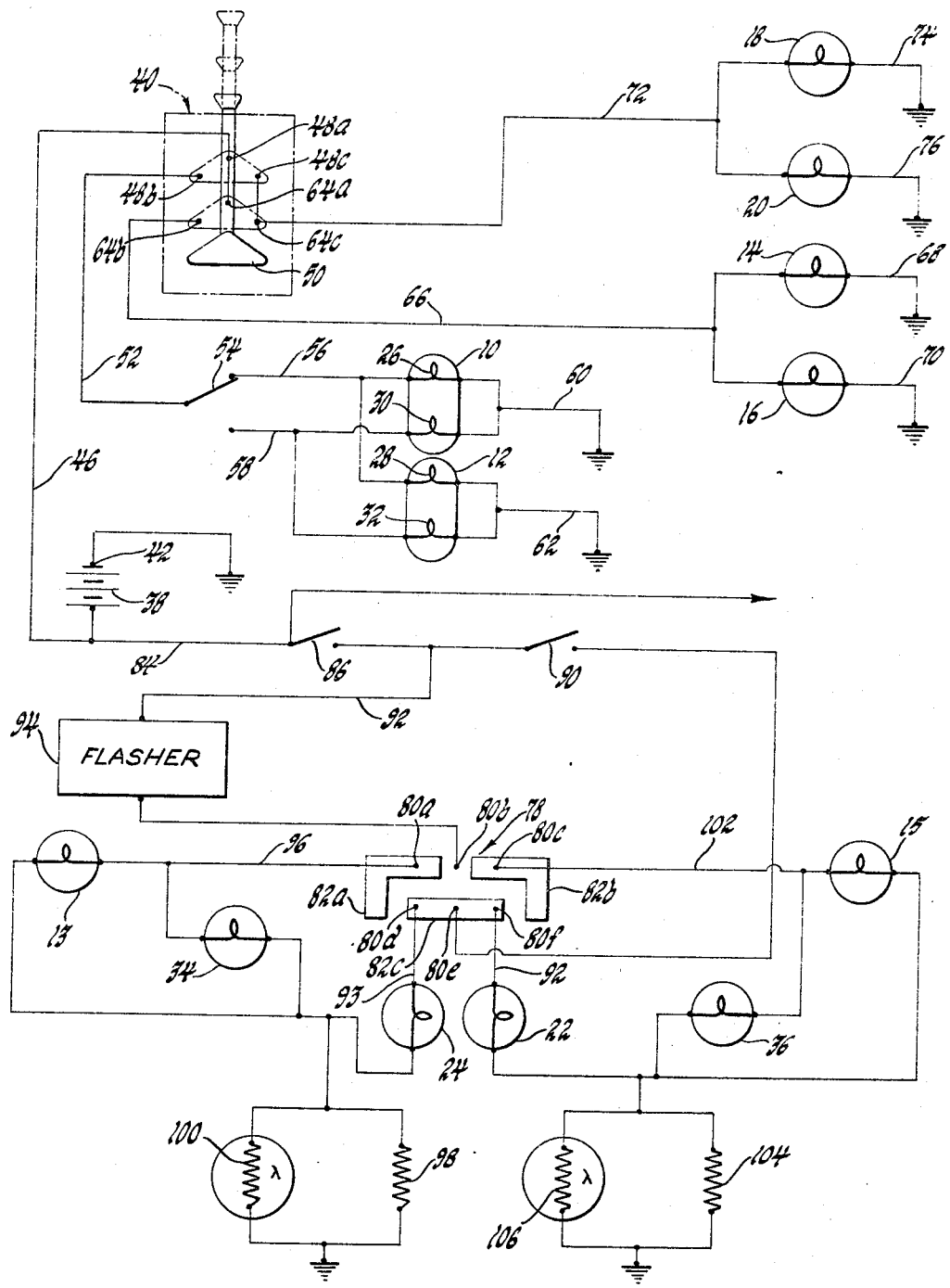

3,277,442
SIGNAL BRIGHTNESS CONTROL
William R. Kearney, Kokomo, Ind., assignor to General Motors Corporation, Detroit, Mich., a corporation of Delaware
Filed Mar. 6, 1963, Ser. No. 263,227
4 Claims. (Cl. 340—84)

This invention relates to motor vehicle illumination systems and more particularly to a circuit for controlling the brightness of motor vehicle warning lamps.

Motor vehicles are ordinarily provided with operating lamps such as headlamps, tail lamps, and parking lamps; and in addition, they are usually equipped with warning lamps such as a brake or stop lamp, turn signal indicator lamps, and pilot lamps.

Because of the necessity of providing sufficient brilliance to command attention during daylight driving conditions, the warning lamps presently used on motor vehicles are often too bright and cause objectionable glare under twilight or nighttime driving conditions. Numerous brightness control systems have been suggested which employ switching arrangements usually controlled by the headlamp switch for switching a resistor in and out of the warning lamp circuit. This arrangement has not proven entirely satisfactory, however, since a more complex and expensive headlamp switch is required due to the necessity of adding additional contacts on the switch.

In accordance with this invention, the drawbacks associated with the prior art brightness control systems have been overcome by providing a system comprising means for automatically adjusting the intensity of the warning lamps under daylight or nighttime driving conditions. This is accomplished by placing a light-sensitive resistor in the circuit of the warning lamps thereby varying the amount of current flowing through the lamps.

A better understanding of this invention may be had from the detailed description which follows taken with the single figure of the drawings which is a schematic representation of a vehicle illumination system including means for controlling the brilliance of the warning lamps in accordance with a preferred embodiment of the invention.

Referring to the drawings, there is illustrated a vehicle illumination system comprising headlamps 10, 12, turn signal indicator lamps 13, 15, and parking lamps 14, 16 located at the forward end of the vehicle and tail lamps 18, 20 and stop and turn indicator lamps 22, 24 located at the rear of the vehicle. The headlamps 10, 12 employ conventional dual filament lamp bulbs having selectively energizable high beam filaments 26, 28 and low beam filaments 30, 32, respectively. In addition to the aforementioned vehicle lights, the illumination system further comprises pilot lamps 34, 36 located inside the motor vehicle. The vehicle lamps are energized from a suitable D.C. power source such as the vehicle storage battery 38. A headlamp switch 40 may be moved to one of three positions to selectively energize the tail lamps and parking lamps or the headlamps and tail lamps, respectively, as illustrated.

The headlamp circuit may be traced from the grounded terminal 42 through the battery 38, conductor 46, through the headlamp switch 40 comprising stationary contact 48a, movable contact 50, stationary contact 48b, conductor 52, beam switch 54, conductor 56 or 58 depending upon the position of switch 54, and the high or low beam filaments of headlamp 10, 12 connected in parallel to ground through conductors 60 and 62. The parking lamp circuit may be traced from the battery 38, conductor 46, headlamp switch 40 comprising stationary contacts 48a and 64a, movable contact 50, stationary contact 64b, conductor 66, and the parking lamps 14 and 16 connected in parallel to ground through conductors 68 and 70. The tail lamps are simultaneously energized with the actuation of the headlamp or parking lamp through either stationary contacts 48c and 64c or 64a and 64c of the headlamp switch 40 depending upon whether the headlamps or parking lamps are energized, conductor 72 and tail lamps 18 and 20 connected in parallel to ground through conductors 74 and 76, respectively.

When the headlamp switch 40 is in the off position, the movable conductor 50 does not bridge any of the stationary contacts of the light switch 40 and the operating lamps are de-energized.

The turn signal switch 78 comprises stationary contacts 80a, 80b, 80c, 80d, 80e, 80f, and movable contacts 82a, 82b, 82c. The movable contacts 82a, 82b, and 82c may be moved from a neutral position to either a left or right turn position by a suitable turn signal lever.

In order that a flashing turn indication may be obtained, stationary contact 80b of the turn signal switch 78 is connected to the battery 38 through the ignition switch 86, conductor 92, and a turn signal flasher 94 which may be an interrupter of any appropriate type such as those conventionally used on the commercial market.

The left front turn signal indicator lamp 13 and the left pilot lamp 34 are connected to the stationary contact 80a through the conductor 96. The right front turn signal indicator lamp 15 and the right pilot lamp 36 are connected to the stationary contact 80c through the conductor 102. The left rear turn signal indicator and stop lamp 24 is connected to the stationary terminal 80d through the conductor 93. The right rear turn signal indicator and stop lamp 22 is connected to the stationary terminal 80f through the conductor 92. Connected in the ground circuit of the warning lamps 13, 24, and 34 is the parallel circuit of a resistor 98 and a photoresistor 100. A parallel circuit comprising resistor 104 and photoresistor 106 is connected in the ground circuit of the warning lamps 15, 22, and 36.

With the turn signal switch 78 in its neutral position and the ignition switch closed, the stop lamp circuit may be traced from the negative terminal of the battery 42 through the battery 38, conductor 84, ignition switch 86, stop switch 90 operated by the brake pedal to the stationary contact 80e, through the movable contact 82c to conductors 92 and 93 to energize the stop lamps 22 and 24 to ground through the parallel circuit of resistor 98 and photoresistor 100.

If a left turn is being signaled, the movable contacts 82a, 82b, 82c will be shifted to the right which will connect the stationary contacts 80b and 80d with the movable contact 82a which will thereby apply the periodically interrupted voltage from the flasher 94 through the conductor 96 to the left front turn signal indicator and pilot lamps 13 and 34, respectively, and through conductor 93 to the left rear turn signal indicator lamp. If a right turn is being signaled, the movable contacts 82a, 82b, and 82c will be shifted to the left causing movable contact 82b to bridge stationary contacts 80b and 80f to apply the periodically interrupted voltage from the flasher 94 to the right front and rear turn signal indicator lamps 15 and 22, respectively, and to the pilot lamp 36. An examination of the turn signal switch 78 will show that if a left turn is to be signaled and the stop switch 90 is closed by the operator pressing the brake pedal, the left rear turn signal indicator lamp 24 will be energized intermittently by the flasher 94, but the right stop lamp 22 will have the constant battery voltage applied thereto through the stationary contact 80e, movable contact 82c, stationary contact 80f, and conductor 92; and conversely, if the stop switch 90 is closed while a right turn is being signaled, the right rear turn signal indicator lamp 22 will be energized from the intermittent voltage of the flasher 94 while the left stop lamp 24 will be energized from the battery 38 through the stationary contact 80e, movable contact 82c, stationary contact 80d, and conductor 93.

In order to vary the intensity of the warning lamps during daylight and nighttime driving conditions, light-sensitive resistors 100 and 106 are connected in the circuit of lamps 13, 24, 34, and 15, 22, 36, respectively. The photoresistors 100 and 106 may be conveniently located at any appropriate place on the motor vehicle as long as they are exposed to ambient light. Under daylight driving conditions, the photoresistors 100 and 106 have a very low value of resistance essentially short circuiting the resistors 98 and 104, respectively, and allowing the warning lamps to emit light of a first pre-selected intensity. During night driving conditions when it is desirable to lower the intensity of the warning lamps, the photoresistors 100 and 106 will have a very high value of resistance, and the current flow through the warning lamps will be essentially determined by the resistance of resistors 98 and 104 which may be selected to cause the lamps to emit a pre-selected lower intensity. Under dusk or dawn driving conditions, the lamps will emit an intermediate intensity determined by the total resistance in the ground circuit. There is thus provided a simple, efficient, and inexpensive signal brightness control system in which objectionable nighttime glare from the warning lamps of a vehicle is eliminated and yet affords sufficient brilliancy therefrom during daylight operating conditions.

It should be understood that the above-described arrangement is illustrative of the application of the principle of the invention and that other arrangements and modifications may be devised by those skilled in the art without departing from the spirit and scope thereof.

I claim:
1. A warning lamp intensity control circuit comprising a D.C. source of power, a warning lamp, a parallel circuit comprising a light sensitive resistor and a second resistor, a flasher connected to said source, a turn signal switch, said lamp and said parallel circuit connected directly across said source and said flasher through said switch whereby said lamp is flashed between zero intensity and a level of visible intensity which is continuously variable in accordance with the value of ambient illumination impinging upon said light-sensitive resistor.

2. A warning lamp intensity control circuit comprising a D.C. source of intermittent power, a warning lamp, a parallel circuit consisting of a light-sensitive resistor and a second resistor, switching means, said lamp and said parallel circuit connected directly across said source through said switching means whereby said lamp is flashed between zero intensity and a first level of visible intensity when said light-sensitive resistor is exposed to a first value of ambient illumination and whereby said lamp is flashed between zero intensity and a second lower level of visible intensity when said light-sensitive resistor is exposed to a second lower level of ambient illumination.

3. In an automobile lighting system a warning lamp intensity control circuit comprising a source of power having a first and second terminal, said first terminal being grounded, a flasher connected to said second terminal, a first parallel circuit comprising a first turn signal indicator lamp and a pilot lamp, a second parallel circuit connected to ground and comprising a light-sensitive resistor and a second resistor, means connecting said first and second parallel circuit in series, a second turn signal indicator lamp connected to the junction between said first and second parallel circuits, a turn signal switch connecting said flasher in series with said lamps whereby said lamps are flashed between zero intensity and a first level of visible intensity when said light-sensitive resistor is exposed to a first value of ambient illumination and whereby said lamps are flashed between zero intensity and a second lower value of visible intensity when said light-sensitive resistor is exposed to a second lower value of ambient illumination.

4. In an automobile lighting system, a warning lamp intensity control circuit comprising a D.C. source of power, a first parallel circuit comprising a first turn signal indicator lamp and a pilot lamp, a second parallel circuit comprising a light sensitive resistor and a second resistor, a flasher, a second turn signal indicator lamp connected to the junction between said first and second parallel circuits, a turn signal switch connecting said flasher in series with said lamp and across said source whereby said lamps are flashed between zero intensity and a level of visible intensity which is continuously variable in accordance with the ambient light impinging upon said light sensitive resistor.

References Cited by the Examiner
FOREIGN PATENTS
809,574   2/1959   Great Britain.

NEIL C. READ, *Primary Examiner.*

T. A. ROBINSON, *Assistant Examiner.*